N. DEDRICK.
ELECTRIC STERILIZING OVEN.
APPLICATION FILED FEB. 5, 1916.
1,213,163. Patented Jan. 23, 1917.
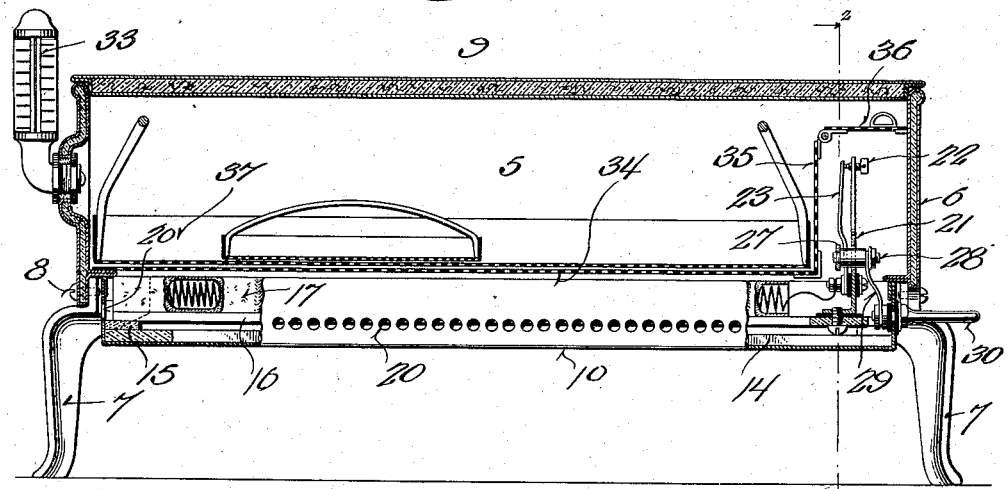
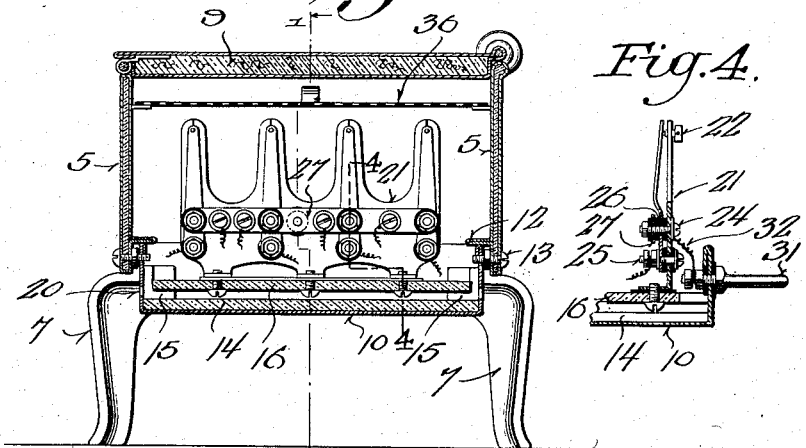
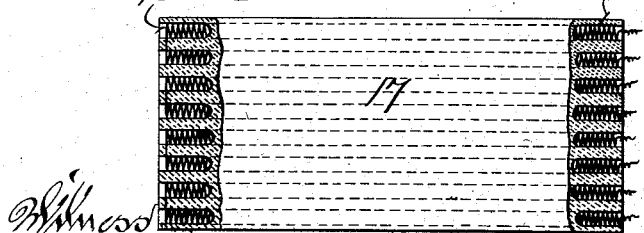

UNITED STATES PATENT OFFICE.

NICHOLAS DEDRICK, OF MANITOWOC, WISCONSIN, ASSIGNOR TO CARL H. SEEGER, OF MANITOWOC, WISCONSIN.

ELECTRIC STERILIZING-OVEN.

1,213,163.  Specification of Letters Patent.  Patented Jan. 23, 1917.

Application filed February 5, 1916. Serial No. 76,275.

*To all whom it may concern:*

Be it known that I, NICHOLAS DEDRICK, a citizen of the United States, and resident of Manitowoc, in the county of Manitowoc and State of Wisconsin, have invented certain new and useful Improvements in Electric Sterilizing-Ovens; and I do hereby declare that the following is a full, clear, and exact description thereof.

The present invention relates to new and useful improvements in electric heating devices and is more particularly directed to the provision of a sterilizing oven adapted for use in sterilizing dental or surgical instruments although various features of the invention may find application in other connections.

It is an object of the present invention to provide an efficient and comparatively simple sterilizing oven for the purpose above specified, and it is further an object to provide heat regulating means associated therewith whereby various desired degrees of heat may be maintained in the oven.

Another object resides in the provision of such a sterilizing oven wherein the heating member thereof may be readily detached from the body portion and wherein the heating member, when associated therewith, is efficiently protected from possible accidental damage.

A still further object resides in the provision of an improved heating member for the oven wherein provision is made for an exceedingly rapid heating and wherein heat is properly distributed through the oven in the various heating operations of the member.

With the above and other objects and advantages in view, the invention resides more particularly in the novel combination, arrangement and formation of parts more particularly hereinafter described and particularly pointed out in the appended claims.

In the drawings: Figure 1 is a longitudinal vertical sectional view through the improved oven on the line 1—1 of Fig. 2. Fig. 2 is a transverse sectional view taken through the oven on the line 2—2 of Fig. 1. Fig. 3 is a plan view of the improved heating block, with portions thereof broken away in section. Fig. 4 is a detail sectional view on the line 3—3 of Fig. 2.

Referring now more particularly to the accompanying drawings, the body portion of the oven comprises side and end walls 5 and 6 respectively each comprising a pressed metal casing provided with a filler of suitable heat insulating quality, and this body is supported by leg members 7 having angular securing flange portions 8 fixed in the bottom corner portions of the body. A suitable cover 9 is hinged to one of the side walls 5 and is formed preferably in a manner similar to the formation of the side walls.

The bottom portion of the oven is detachably connected with the body portion described and comprising a pan shaped member 10 adapted to fit within the bottom of the body and to bear against a continuous flange member 12 projecting inwardly from the walls of the body, this pan member being secured in place by screws 13 passed through the bottom edge portions of the walls and through its flange portions. The bottom of the pan member carries a heat insulating plate 14 and in each corner of the pan member is provided a spacing block 15 each cut away in its inner upper corner to fit a second plate 16 which is thus held spaced from the sides of the pan and from the bottom plate 14. Carried on this plate 16 is the heating block 17 which is of a width slightly greater than the distance between opposite flange portions 12 and which is of a height substantially equal to the distance between the flange portions and the plate 16 on which it is positioned whereby the block may abut the flange portions of the side walls and one end wall, the block being spaced from the other end wall to provide for the thermostat chamber later to be described. This heating block is preferably formed of asbestos or similar material and is provided with a plurality of longitudinal openings 18, there being eight openings in the present instance, and in each pair of adjacent openings 18 is positioned respective coils 19 of a double coil element, the ends of respective coils being connected adjacent the end of the block farthest from the thermostat chamber, and the other ends of the coils being extended for attachment with the thermostat structure. The sides of the pan member at its end farthest from the thermostat chamber are provided with series of openings 20 to permit escape of expanded air, and ingress of air through these openings into the oven is prevented due to the fact that such air must pass either under the plate 16 or through the passages of the heating block.

Taking up now the thermostat structure, an upstanding metallic plate 21 is carried by the end of the plate 16 adjacent the spaced end of the thermostat block and this plate includes a plurality of, and in this instance four upstanding finger portions through the upper end of each of which is threaded a contact screw 22 and carried by the plate adjacent each finger portion is a thermostat bar 23 which is preferably secured to and insulated from the plate by pairs of upper and lower bolts 24 and 25 respectively with which are associated suitable insulation members 26. The upper bolts 24 also carry a bar 27 to which is secured a wire extending from each of the double coil heating elements and the lower bolts 25 comprise binding posts to which are attached the other wires of the said heating elements. Carried by the bar 27 which is as noted disposed inwardly of the plate 20 is a binding post 28 extending through the plate 21 without contact therewith and connected by a suitable connection 29 with a pin member 30 adapted to be associated with a conventional electric plug member, another pin 31 being connected directly to the plate 21 by a connection 32. Thus a circuit is provided for each heating element including the plug pin 30, the bar 27, the said heating element, a respective thermostat bar 23, the plate 21 and the other plug pin 31.

By providing a plurality of thermostat members in conjunction with the heating elements a comparative nicety of adjustment for various desired heats maintained in the oven may be had by adjustment of the contact screws 22 to provide for their respective thermostat bars breaking contact at various heats.

One of the heating elements is preferably of such heating power as to maintain a proper sterilizing heat within the oven, and thus in the ordinary use of the device one of the contact screws 22 is so associated that its contact with the respective thermostat bar will not be broken at that desired temperature and the other screws are arranged so that their contacts will be broken upon reaching that temperature. For determining the temperature within the oven, the end wall thereof, opposite the thermostat structure has a portion outwardly offset and passed through and secured in this offset portion is the laterally turned end of a thermometer 33 of conventional type.

To shield the thermostat and heating block a foraminous plate 34 is disposed within the oven and secured on the flange portions 12, this plate terminating short of the thermostat structure in an upstanding wall portion 35 to which is hinged a foraminous cover member 26 for the thermostat chamber thus formed. Foraminous trays 37 are provided for carrying the various instruments to be sterilized.

Thus there has been provided a comparatively simple and exceedingly efficient sterilizing oven particularly adapted for sterilizing dental or surgical instruments, and wherein a variety of degrees of heat may be procured.

I claim:

1. An electric sterilizing oven comprising a body formed of heat insulating material, a foraminous partition disposed horizontally in the body, and terminating at one end in an upstanding wall portion spaced from the adjacent end of the body to form a thermostat chamber, a heating member disposed below the partition and including a plurality of elements and thermostats in the chamber for controlling respective elements.

2. An electric sterilizing oven comprising a body including side and end walls, a cover and a bottom, an inwardly projecting horizontal flange at the lower portions of said side and end walls, a heating member resting against said flange and spaced from the bottom and from one end of the body, and the body being provided with openings between the heating member and bottom.

3. An electric sterilizing oven comprising a body portion including side and end walls and a cover, inwardly extending flanges carried by the lower portions of the walls, a pan shaped body member engaged in the bottom of the body to abut the flanges to form a closure for said bottom, a heating block carried by the bottom member and spaced from the bottom and sides thereof and engaging the flanges of the side walls and one end wall, and the sides and the adjacent end of the bottom pan member being provided with openings communicating with the heating block passages.

In testimony that I claim the foregoing I have hereunto set my hand at Manitowoc, in the county of Manitowoc and State of Wisconsin, in the presence of two witnesses.

NICHOLAS DEDRICK.

Witnesses:
E. L. PLEUSS,
H. A. ELFNER.